Patented Apr. 29, 1952

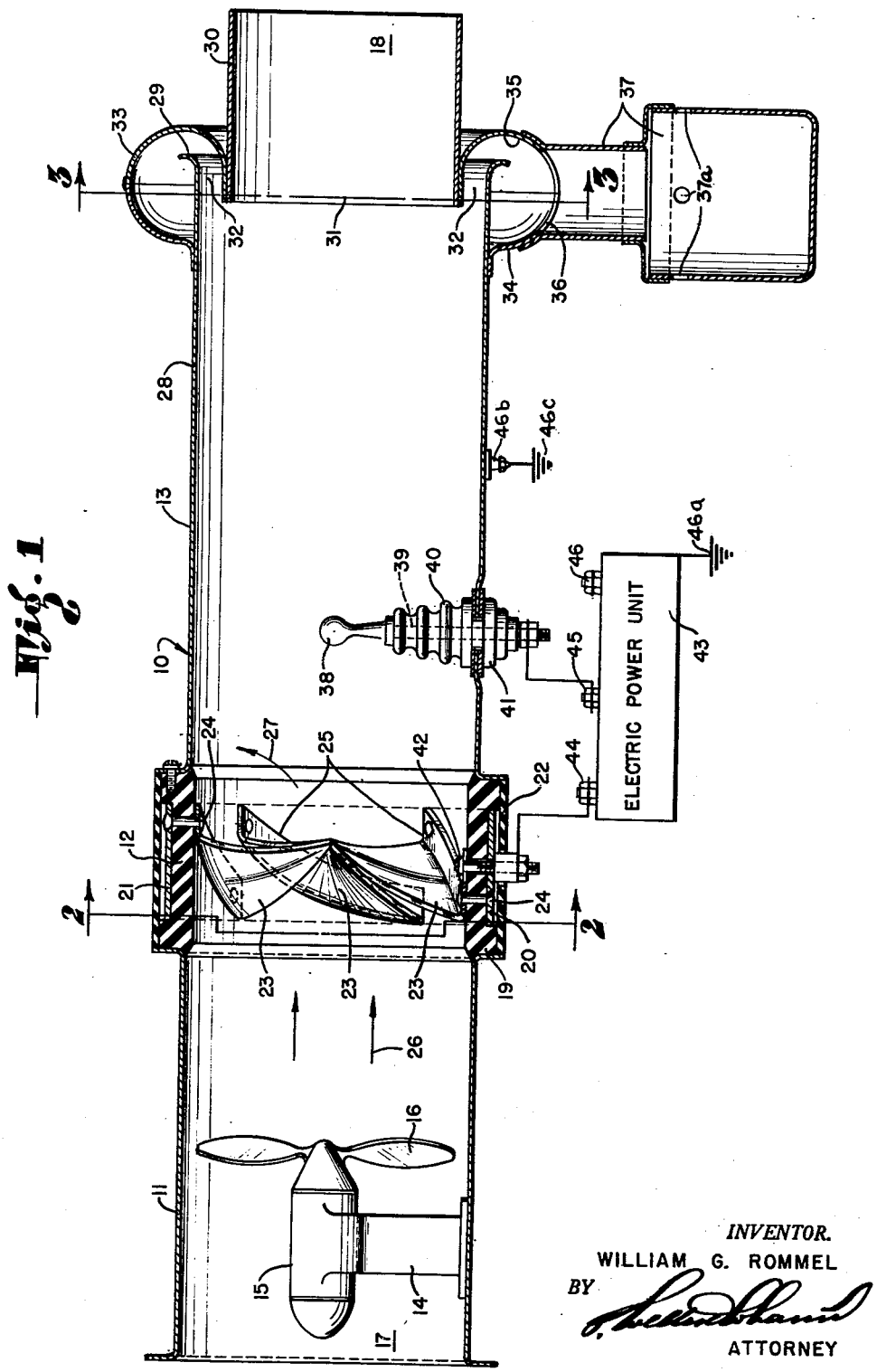

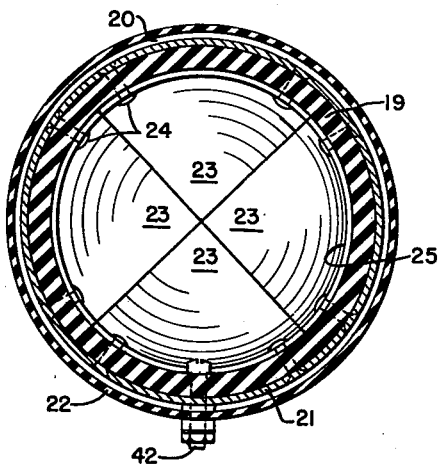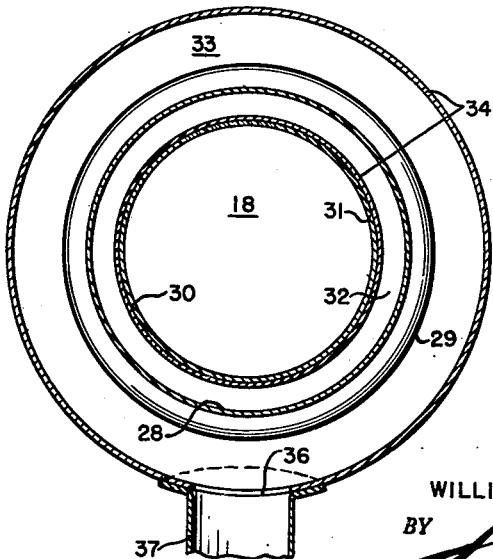

2,594,805

UNITED STATES PATENT OFFICE 2,594,805

AIR CLEANER

William G. Rommel, Playa Del Rey, Calif., assignor to The Garrett Corporation, Airesearch Manufacturing Company division, Los Angeles, Calif., a corporation of California Application June 26, 1945, Serial No. 601,667

6 Claims. (Cl. 183—7)

My invention relates in general to air cleaners and relates in particular to a simplified air cleaner wherein dust particles, smoke, mist and water may be removed from a flow of air or other gaseous fluid.

It is an object of the invention to provide an air cleaner which may be installed in a duct through which a flow of air is passing toward a point of utilization, this air cleaner being especially suitable for use on aircraft cabins in conjunction with the cabin pressurizing and air conditioning systems because of its light weight and compact form.

It is an object of the invention to provide an air cleaner wherein parts are cooperatively arranged so as to accomplish in a relatively short distance of air flow an effective removal from the air flow of contaminating particles.

A further object of the invention is to provide an air cleaner having an enclosure or a housing defining a path of flow for the air to be cleaned with a simple means for producing a swirling of the air flow as it moves toward the outlet of the device, and impressing electro-potential on the particles carried by the air in such effective manner that these particles will be repelled outwardly from the positively charged electrodes of the device toward a negatively charged wall which lies along or around the path of flow, these particles passing through an annular mouth into a receptacle or collector as a result of the application of electrostatic and centrifugal forces to the particles.

A further object of the invention is to provide in an electrostatic air cleaner or separator, two separate positively charged electrodes or poles, one of these electrodes being centralized with respect to the path of flow through the device and the other of the electrodes being marginal, so called for the reason that it extends toward the margin of the path of flow.

An object of the invention is to provide in a device of this character positively charged electrodes such as described in the preceding paragraph, the centralized electrode being positioned downstream from the marginal electrode and being maintained at a higher electrical potential than the marginal electrode.

A further object of the invention is to provide a simple form of construction wherein vanes are supported in the path of flow of the air in insulated relation to the shell or enclosure of the device, these vanes being formed of metal so as to serve as electrodes or poles and being shaped and positioned so as to cause the air which passes the same to swirl rapidly. In the device I have shown a fan acting to produce movement of air from the inlet to the outlet. This fan may or may not be used when the device is installed in an air duct through which there is an established flow of air. Where the fan is used under such conditions, it assists in maintaining a desired velocity of air flow.

Further objects and advantages of the invention will be brought out in the following parts of the specification.

Referring to the drawings which are for illustrative purposes only:

Figure 1 is a sectional view showing a preferred embodiment of my invention;

Figure 2 is a cross section taken as indicated by the line 2—2 of Figure 1; and

Figure 3 is a cross section taken as indicated by the line 3—3 of Figure 1.

As shown in Figure 1, the device employs an enclosure or shell 10 which is most conveniently made in tubular or cylindric form so that it may be connected between consecutive portions of an air duct leading to a chamber, such as an aircraft cabin which is to receive the cleaned and conditioned air. The shell 10 has three axially aligned sections 11, 12 and 13. Section 11 is a metal tube and therein, by means of radial arms 14, a motor 15 is supported in a position to drive a fan 16 capable of producing a rapid movement of air from the inlet 17 of the device to its outlet 18.

The intermediate section 12 of the shell 10 comprises an inner short cylinder 19 of insulating material having an internal diameter very slightly smaller than the internal diameters of the sections 11 and 13. In the outer cylindric face of the member 19 there is a shallow channel 20 which receives a metal ring 21 covered by a thin cylinder 22 of insulating material. In the practice of the invention, the cylinders 19 and 22 may be both made from Bakelite.

A plurality of metal vanes 23 are secured within the cylinder 19 by metal rivets 24 which extend through flanges 25 formed on the vanes 23, through openings in the cylinder 19 and in the metal ring 21, these rivets therefore providing an electrical connection between the ring 21 and the vanes. The vanes 23 are curved as shown in Figure 1 and extend from near the axis of the shell 10 toward and preferably to the margin of the path of flow of air, defined by the inner surface of the member 19.

The air impelled forwardly by the fan 16, or by other means, as indicated by the arrow 26, passes through the electrification zone defined by section 12, and in passing through section 12 the flow of air is acted on by the vanes, causing the same to swirl rapidly as indicated by arrows 27.

The section 13 comprises a metal cylinder 28 connected at its front end to the cylindrical member 19 and having at its rightward or downstream end an out-turned lip 29. The outlet 18 of the device is formed by a relatively short cylinder 30, smaller in diameter than the cylinder 28 and being positioned so that its leftward end or annular edge 31 will project a short distance into the rightward end of the cylinder 28, thereby forming between the overlapping wall portions of the cylinder 28 and the cylinder 30 an annular mouth 32 which is faced upstream or against the flow of air which is traveling through the device. Around the rightward end of the cylinder 28 and in communication with the mouth 32 there is an annular collecting chamber 33 comprising a wall 34 which regarded in cross section as in Figure 1 is curved outwardly from the leftward portion of the cylinder 28 and is then reversely curved as shown at 35 so as to extend around the lip 29, in spaced relation thereto, to engage the cylinder 30 adjacent its inner edge 31. In the lower part of the wall 34 of the collector 33 there is an outlet opening 36 which, when the device is employed in an aircraft, may be connected through suitable piping with the exterior, or which may be connected as shown with a receptacle 37 in which the removed particles may accumulate. Air may escape from the receptacle through small openings 37a spaced upwardly from the bottom of said receptacle. The air will escape rather slowly from the receptacle and the dust or other foreign particles entrained in the air stream will collect in the bottom portion of the receptacle. Also, the air flowing through the conduit or shell 10 moves relatively slower therethrough so that the device works very effectively in separating and cooling foreign particles entrained in the air stream.

An electrode body 38 formed as a ball is positioned near or preferably upon the axis of the path of flow of air toward the outlet 18. This ball is of metal and is situated on the inner end of a metallic post 39 which extends through the wall of the cylinder 28 to the exterior for the purpose of external electrical connection. This post 39 is fully insulated from the cylinder 28 by insulators 40 and 41. The ball 38 is disposed between the vanes 23 and collector 33, but is preferably closer to the vanes 23 than to the mouth 32 of the collector 33.

As further shown in Figure 1, a screw 42 is provided as a terminal for making electrical connection with the vanes 23, this screw passing through the flange 25 of one of the vanes 23 and through the ring 21 to the exterior. A power source 43 is provided having positive terminals 44 and 45 and a negative terminal 46, the terminals 44 and 45 being connected respectively to the screw 42 and to the post 39. The terminal 46 is grounded to the housing of the electric power unit which is grounded, as at 46a, while the terminal 46b is connected to the cylinder 28, the latter being grounded at 46c so that the terminal 46 is connected to the metal cylinder 28 through the ground and said cylinder is at ground potential. The power source 43 is capable of producing a high potential difference between its positive electrodes 23 and 38 and its negative electrode or pole formed by the cylinder 28. The potential applied to the ball 38, however, is greater than the potential impressed upon the vanes 23, so that the greatest potential difference exists between the ball 38 and the cylinder 28.

In the operation of the device the centrifugal action resulting from the swirling of the air flow between vanes 23 carries heavier dust particles outward toward the cylinder 28, and this swirling action will have a lesser centrifugal effect upon the smaller particles entrained in the air flow in keeping with the masses of these respective smaller particles. However, the particles become positively charged in their passage through the section 12, due to their engagement with or movement in close proximity to the electrodes formed by the vanes 23. Accordingly, these charged particles, as they pass toward the outlet 18, are brought under the influence of the electrostatic field existing between the ball 38 and the cylinder 28 and since they are positively charged, the particles will be repelled by the ball electrode 38 and attracted to the cylinder 28 with the result that they will travel along the surface of the cylinder 28 and through the mouth 32 into the collector 33.

I claim:

1. In a device for separating particles from a fluid stream, the combination of: an electro-negatively charged cylindrical wall defining a duct through which the fluid stream is adapted to flow, said duct having an inlet and an outlet; an annulus of insulating material spaced from said outlet; vanes projecting from said annulus toward the axis of the path of flow of said fluid stream, said vanes being shaped so as to swirl the fluid as it passes toward said outlet; means for impressing a positive potential on said vanes; a ball electrode; means extending inwardly from said wall for supporting said ball electrode near the axis of said path of flow and downstream from said vanes; means for impressing on said ball electrode a positive electro-potential greater than the potential impressed on said vanes; and a collector disposed in said path of flow between said negatively charged wall and said outlet.

2. In a device for separating particles from a fluid stream, the combination of: an electro-negatively charged conduit defining a path of flow for said fluid stream, said conduit having an inlet and an outlet; an annulus of insulating material spaced upstream from said outlet; vanes projecting from said annulus toward the axis of said path of flow, said vanes being shaped so as to swirl the fluid as it passes toward said outlet; means for impressing a positive potential on said vanes; a ball electrode; means extending into said conduit for supporting said ball electrode near the axis of said path of flow and downstream from said vanes; means for impressing on said ball electrode a positive electro-potential greater than the potential impressed on said vanes; a tubular member forming an upstream facing lip in said path of flow adjacent said outlet to form a collector mouth adjacent the periphery of said stream; and means forming a collecting chamber externally of said conduit and communicating with said mouth.

3. In a device for separating particles from a fluid stream, the combination of: an electro-negatively charged cylindrical wall defining a duct through which the fluid stream is adapted to flow, said duct having an inlet and an outlet; an annulus of insulating material spaced from said outlet; vanes projecting from said annulus toward the axis of the path of flow of said fluid stream, said vanes being shaped so as to swirl the fluid as it passes toward said outlet; means for impressing a positive potential on said vanes; a ball electrode; means extending inwardly from said wall for supporting said ball electrode near the axis of said path of flow and downstream from said vanes; and means for impressing on said ball electrode a positive electro-potential greater than the potential impressed on said vanes.

4. In a device for separating particles from a fluid stream, the combination of: an electro-negatively charged conduit defining a path of flow for said fluid stream, said conduit having an inlet and an outlet; an annulus of insulating material spaced upstream from said outlet; vanes projecting from said annulus toward the axis of said path of flow, said vanes being shaped so as to swirl the fluid as it passes toward said outlet; means for impressing a positive potential on said vanes; a ball electrode; means extending into said conduit for supporting said ball electrode near the axis of said path of flow and downstream from said vanes; means for impressing on said ball electrode a positive electro-potential greater than the potential impressed on said vanes; and a tubular member forming an upstream facing lip in said path of flow adjacent said outlet to form a collector mouth adjacent the periphery of said stream.

5. In a device for separating particles from a fluid stream: a straight electrically charged conduit defining a path of flow for said fluid stream, said conduit being disposed horizontally and having an inlet and an outlet; means for inducing a swirling movement to the fluid of said stream as it moves through said conduit; means for impressing an electric charge on said swirling means, said charge being of opposite sign from that of the wall of the conduit; electrode means in said fluid stream located between said swirling means and said outlet; means for impressing an electric charge on said electrode, said charge being of higher potential than that on the swirling means and of the same sign, said electrode means being so located that particles entrained in the fluid will pass between same and the electrically charged wall; and collecting means disposed so as to collect particles separated from the fluid stream by the electrically charged means.

6. In a device for separating particles from a fluid stream, the combination of: an electro-negatively charged cylindrical wall defining a duct through which the fluid stream is adapted to flow, said duct having an inlet and an outlet; an annulus of insulating material spaced from said outlet; vanes projecting from said annulus toward the axis of the path of flow of said fluid stream, said vanes being shaped so as to swirl the fluid as it passes toward said outlet; means for impressing a positive potential on said vanes; a ball electrode; means extending inwardly from said wall for supporting said ball electrode near the axis of said path of flow and downstream from said vanes; means for impressing on said ball electrode a positive electro-potential greater than the potential impressed on said vanes; and collector means disposed in said path of flow between the negatively charged wall and said outlet, said collector means including a collecting receptacle having bleed means therein for the bleeding of air from said receptacle.

WILLIAM G. ROMMEL.

REFERENCES CITED

The following references are of record in the file of this patent:

UNITED STATES PATENTS

| Number | Name | Date |
| --- | --- | --- |
| 1,371,995 | Nesbit | Mar. 15, 1921 |
| 1,381,719 | McGee et al. | June 14, 1921 |
| 1,440,887 | Nesbit | Jan. 2, 1923 |
| 2,101,168 | Deutsch | Dec. 7, 1937 |

FOREIGN PATENTS

| Number | Country | Date |
| --- | --- | --- |
| 83,440 | Austria | Apr. 13, 1921 |
| 425,039 | Germany | Feb. 11, 1926 |
| 562,893 | Germany | Nov. 2, 1932 |